B. S. & E. H. HAVILAND.
Bee Hive.
No. 64,864. Patented May 21, 1867.
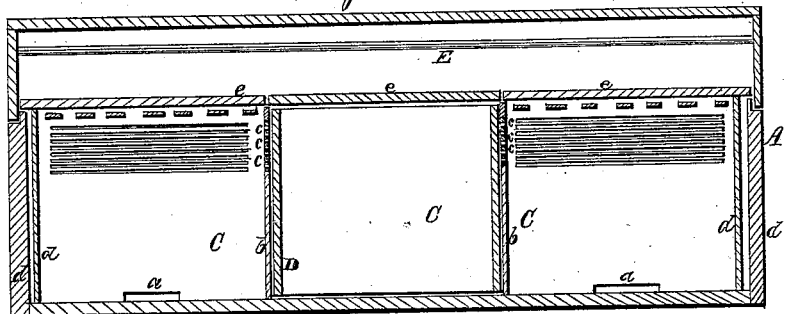
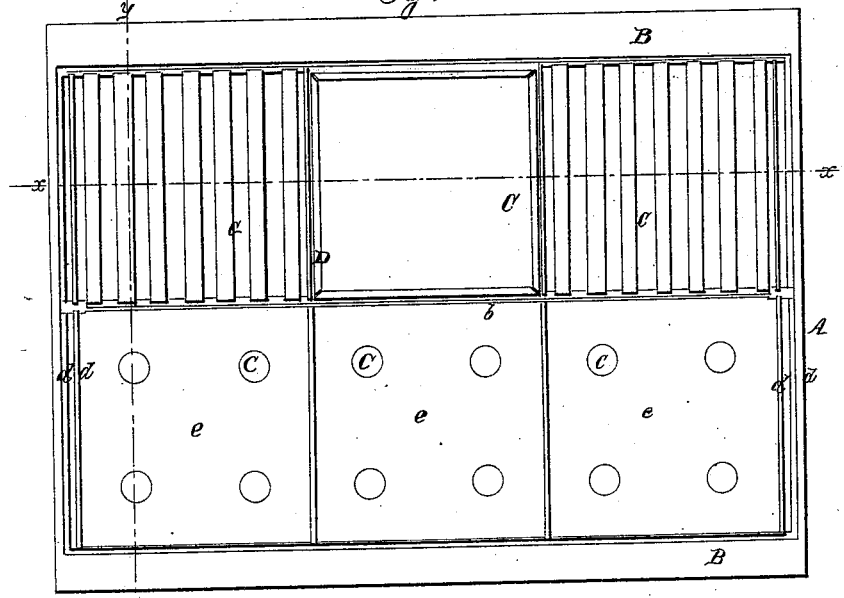
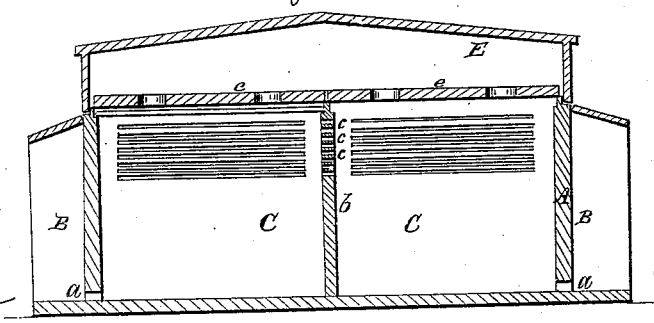

United States Patent Office.

B. S. AND E. H. HAVILAND, OF FORT DODGE, IOWA.

Letters Patent No. 64,864, dated May 21, 1867.

---

IMPROVEMENT IN BEE-HIVES.

---

*The Schedule referred to in these Letters Patent and making part of the same.*

---

TO ALL WHOM IT MAY CONCERN:

Be it known that we, B. S. HAVILAND and E. H. HAVILAND, of Fort Dodge, in the county of Webster, and State of Iowa, have invented a new and improved Bee-Hive; and we do hereby declare that the following is a full, clear, and exact description thereof, which will enable others skilled in the art to make and use the same, reference being had to the accompanying drawings, forming part of this specification, in which—

Figure 1 is a vertical section of our invention, taken in the line $x\ x$, fig. 2.

Figure 2, a plan or top view of the same, with the top or cover removed.

Figure 3, a vertical section of the same, taken in the line $y\ y$, fig. 2.

Similar letters of reference indicate like parts.

This invention relates to a new and improved bee-hive of that class in which a plurality of colonies is kept within a single box or house. The object of the invention is to afford a circulation of air through the several hives in the box or house, so that the animal heat from all the bees will circulate freely through it, and in case of a weak colony being in the box or house it will receive a requisite amount of warmth from the others. The invention has also for its object the isolating of a hive from the others, when necessary, in order that an empty hive may be cut off, so that those containing colonies may receive all the benefit of the animal heat, the circulation of the latter being thereby confined to the inhabited hives.

A represents a box or house, which may be of any suitable dimensions according to the number of hives or colonies it is designed to receive. Each side of this box or house is provided with a perch-like projection, B, designed to facilitate the entrance of the bees into the house, openings $a$ being made in the lower part of the sides of the house to serve as bee-entrances, (see fig. 3.) This box or house is divided into a number of compartments, C, by vertical partitions, $b$. These compartments constitute the hives, six of which are shown in fig. 2, but more or less may be used, according to the dimensions of the box or house A, the dimensions of the compartments C being about a cubic foot. The partitions $b$ are perforated with holes or openings $c$ which afford a circulation of air through the several compartments, but are too narrow or small to allow the bees to pass through. A bee-entrance, $a$, is made for each compartment or hive, C, and in case a compartment or hive becomes empty, it is cut off from the occupied ones by an adjustable lining, D, shown in figs. 1 and 2, so that the air is allowed to circulate through the occupied hives only. By this means it will be seen that the animal heat from the bees of each individual colony is allowed to pass from the compartment or hive and mingle with that of another colony, and a circulation of warm air passes entirely through all the occupied hives of the box or house. Hence, if a colony of bees be weak or few in number it will be kept in a proper, warm state by the heat from the other hives, whereas if alone in an isolated condition it would perish. Besides this advantage, bees will propagate with greater certainty. They will commence earlier in consequence of the genial temperature, and will increase in numbers early in the season so as to be capable of making a large quantity of spare honey. The end compartments or hives are provided with double walls, as shown at $d\ d$, a dead-air space being allowed between to serve as a protection against cold, (see figs. 1 and 2.) Honey-boards $e$ are placed in the compartments or hives, and the box or house is provided with a removable cap, E, to cover spare honey-boxes.

Having thus described our invention, what we claim as new, and desire to secure by Letters Patent, is—

The arrangement in the bee-box of the perforated partitions $b$ and adjustable partitions D, whereby the communication between the several compartments C may be opened or closed, substantially as described for the purpose specified.

The above specification of our invention signed by us this 3d day of October, 1866.

B. S. HAVILAND,
E. H. HAVILAND.

Witnesses:
CHAS. B. RICHARDS,
D. J. GUE.